United States Patent
Tang et al.

(10) Patent No.: US 11,542,905 B1
(45) Date of Patent: Jan. 3, 2023

(54) PREDICTION OF DRIVER'S INTENTION TO STOP FOR ENGINE START/STOP

(71) Applicants: Chuanchi Tang, Troy, MI (US); Papeeha Thombare, West Bloomfield, MI (US); Drushan Mayalankar, Rochester Hills, MI (US); Shuonan Xu, Troy, MI (US)

(72) Inventors: Chuanchi Tang, Troy, MI (US); Papeeha Thombare, West Bloomfield, MI (US); Drushan Mayalankar, Rochester Hills, MI (US); Shuonan Xu, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/518,035

(22) Filed: Nov. 3, 2021

(51) Int. Cl.
| | |
|---|---|
| *F02N 11/08* | (2006.01) |
| *F02D 41/12* | (2006.01) |
| *G08G 1/052* | (2006.01) |
| *F02D 41/06* | (2006.01) |

(52) U.S. Cl.
CPC ........ *F02N 11/0822* (2013.01); *F02D 41/062* (2013.01); *F02D 41/123* (2013.01); *G08G 1/052* (2013.01); *F02N 2200/0801* (2013.01); *F02N 2200/10* (2013.01)

(58) Field of Classification Search
CPC ......... F02N 11/0822; F02N 2200/0801; F02N 2200/10; F02D 41/062; F02D 41/123; G08G 1/052
See application file for complete search history.

(56) References Cited

U.S. PATENT DOCUMENTS

| | | | | |
|---|---|---|---|---|
| 8,935,075 | B2* | 1/2015 | Otanez | F02N 11/0837 |
| | | | | 123/179.3 |
| 9,045,132 | B1* | 6/2015 | Zhao | F02N 11/0837 |
| 9,751,516 | B2* | 9/2017 | Yu | B60W 10/06 |
| 9,964,090 | B2* | 5/2018 | Khafagy | B60L 50/10 |
| 2005/0010353 | A1* | 1/2005 | Matsubara | B60K 6/543 |
| | | | | 903/918 |
| 2008/0022969 | A1* | 1/2008 | Frenz | B60W 10/04 |
| | | | | 123/347 |
| 2018/0215386 | A1* | 8/2018 | Naserian | F02N 11/0837 |
| 2020/0149484 | A1* | 5/2020 | Geng | F02M 25/0854 |

\* cited by examiner

*Primary Examiner* — Sizo B Vilakazi
(74) *Attorney, Agent, or Firm* — Ralph E. Smith (57) ABSTRACT

A predictive driver intention to stop (DITS) system for a vehicle having an engine includes one or more sensors configured to measure a set of operating parameters of the vehicle including at least (i) vehicle speed and (ii) vehicle deceleration rate. A controller is configured to identify no-stop braking events and complete stop braking events, and reference a generated baseline probability table indicating a probability of a driver braking to bring the vehicle to a stop, based on at least the vehicle speed and vehicle deceleration rate measured during at least one of the identified no-stop braking events and complete stop braking events. The controller is further configured to predict a DITS event based on the generated baseline probability table, and control operation of the engine based on the predicted DITS event to facilitate reducing vehicle fuel consumption and/or tailpipe emissions.

15 Claims, 6 Drawing Sheets

PREDICTION OF DRIVER'S INTENTION TO STOP FOR ENGINE START/STOP

FIELD

The present application generally relates to prediction methodologies and, more particularly, to a predictive methodology for determining a driver's intent to stop a vehicle equipped with engine stop/start control.

BACKGROUND

Some vehicles include systems with internal combustion engine strategies such as fuel shut-off (FSO), engine start-stop (ESS), and cylinder deactivation to save fuel and reduce tailpipe emissions. Drivability, fuel economy, emissions, and technical practicalities are the primary considerations for these systems. However, it can be difficult to determine when such engine control strategies should be employed. Moreover, customer satisfaction can potentially be reduced if the engine control strategy is executed when the driver does not intend or desire the operation. Accordingly, while such vehicle systems work well for their intended purpose, there remains a need for improvement in the relevant art.

SUMMARY

According to one example aspect of the invention, a predictive driver intention to stop (DITS) system for a vehicle having an engine is provided. In one exemplary implementation, the system includes one or more sensors configured to measure a set of operating parameters of the vehicle including at least (i) vehicle speed and (ii) vehicle deceleration rate. A controller is configured to: identify no-stop braking events and complete stop braking events, and reference a generated baseline probability table indicating a probability of a driver braking to bring the vehicle to a stop, based on at least the vehicle speed and vehicle deceleration rate measured during at least one of the identified no-stop braking events and complete stop braking events. The controller is further configured to predict a DITS event based on the generated baseline probability table, and control operation of the engine based on the predicted DITS event to facilitate reducing vehicle fuel consumption and/or tailpipe emissions.

In addition to the foregoing, the described system may include one or more of the following features: wherein the controller is further configured to adapt the baseline probability table based on individual driver behavior by accumulating vehicle speed and vehicle deceleration rate data over a period of no-stop braking events and complete stop braking events; wherein the controller is further programmed to generate an updated probability table based on the accumulated data; wherein the updated probability table is generated by determining a point 'P when engine start/stop (ESS) is allowed, determining a probability error P(error) at point 'P', determining a value P(adapt_value) as a function of P(error) and a calibrated updated rate, and updating one or more matrix cells of the baseline probability table with the P(adapt_value).

In addition to the foregoing, the described system may include one or more of the following features: wherein the baseline probability table is generated from a probability map plotting data samples of vehicle speed and deceleration rate during no-stop braking events and the complete stop braking events; wherein the baseline probability table is further generated from a matrix of the data in the probability map; and wherein the controller is further programmed to identify the no-stop braking event by identifying a high brake release gradient or driver acceleration tip-in during engine start-stop (ESS).

In addition to the foregoing, the described system may include one or more of the following features: wherein controlling operation of the engine based on the predicted DITS event includes initiating an engine start stop (ESS) operation; wherein controlling operation of the engine based on the predicted DITS event includes initiating a rolling engine start stop (R-ESS) operation; wherein controlling operation of the engine based on the predicted DITS event includes initiating a fuel shut off (FSO) operation; and wherein controlling operation of the engine based on the predicted DITS event includes initiating a cylinder deactivation of the engine.

According to another example aspect of the invention, a method of predicting driver intent to stop (DITS) in a vehicle having an engine is provided. In one example, the method includes measuring, by at least one sensor, a set of operating parameters of the vehicle including at least (i) vehicle speed and (ii) vehicle deceleration rate, identifying, by a controller, no-stop braking events and complete stop braking events, and referencing, by the controller, a generated baseline probability table indicating a probability of a driver braking to bring the vehicle to a stop at the vehicle speed and vehicle deceleration rate measured during at least one of the identified no-stop braking events and complete stop braking events. The method further includes predicting, by the controller, a DITS event based on the generated baseline probability table, and controlling, by the controller, operation of the engine based on the predicted DITS event to facilitate reducing vehicle fuel consumption and/or tailpipe emissions.

In addition to the foregoing, the described method may include one or more of the following features: adapting, by the controller, the baseline probability table based on individual driver behavior by accumulating vehicle speed and vehicle deceleration rate data over a period of no-stop braking events and complete stop braking events; generating, by the controller, an updated probability table based on the accumulated data; and wherein the baseline probability table is generated from a probability map plotting data samples of vehicle speed and deceleration rate during no-stop braking events and the complete stop braking events.

In addition to the foregoing, the described method may include one or more of the following features: wherein the baseline probability table is further generated from a matrix of the data in the probability map; identifying the no-stop braking event by identifying a high brake release gradient or driver acceleration tip-in during engine start-stop (ESS); and wherein controlling operation of the engine based on the predicted DITS event includes initiating an engine start stop (ESS) or a rolling engine start stop (R-ESS) operation.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do

DETAILED DESCRIPTION

As previously discussed, engine strategies such as FSO, ESS, and cylinder deactivation may be utilized to reduce fuel consumption and tailpipe emissions. Such control strategies, as well as driver satisfaction, can be further improved and optimized if the system can predict the Driver's Intention To Stop (DITS). In one example, since driver intention estimation is heuristic rather than deterministic, prediction of DITS begins with a basic system utilizing only vehicle speed and deceleration. As vehicle mileage accumulates, statistical data can be updated for future use to further provide adaptive strategy to the predictive DITS. The system can utilize additional inputs and technologies to facilitate statistically increasing the probability of correct driver intention identification and prediction.

Accordingly, described herein are systems and methods of predicting DITS in terms of stop probability based on sensor inputs such as, for example, vehicle speed and deceleration rate, steering wheel gradient, and various engine inputs. The system yields a probability estimate on whether the vehicle will soon come to a complete stop, which is then utilized to assist the vehicle controller in determining whether or not to initiate fuel saving technologies like ESS and Rolling Engine Start Stop (R-ESS). The system is adaptive and configured to accumulate and update the data as the vehicle is driven by specific drivers.

Figure 1:
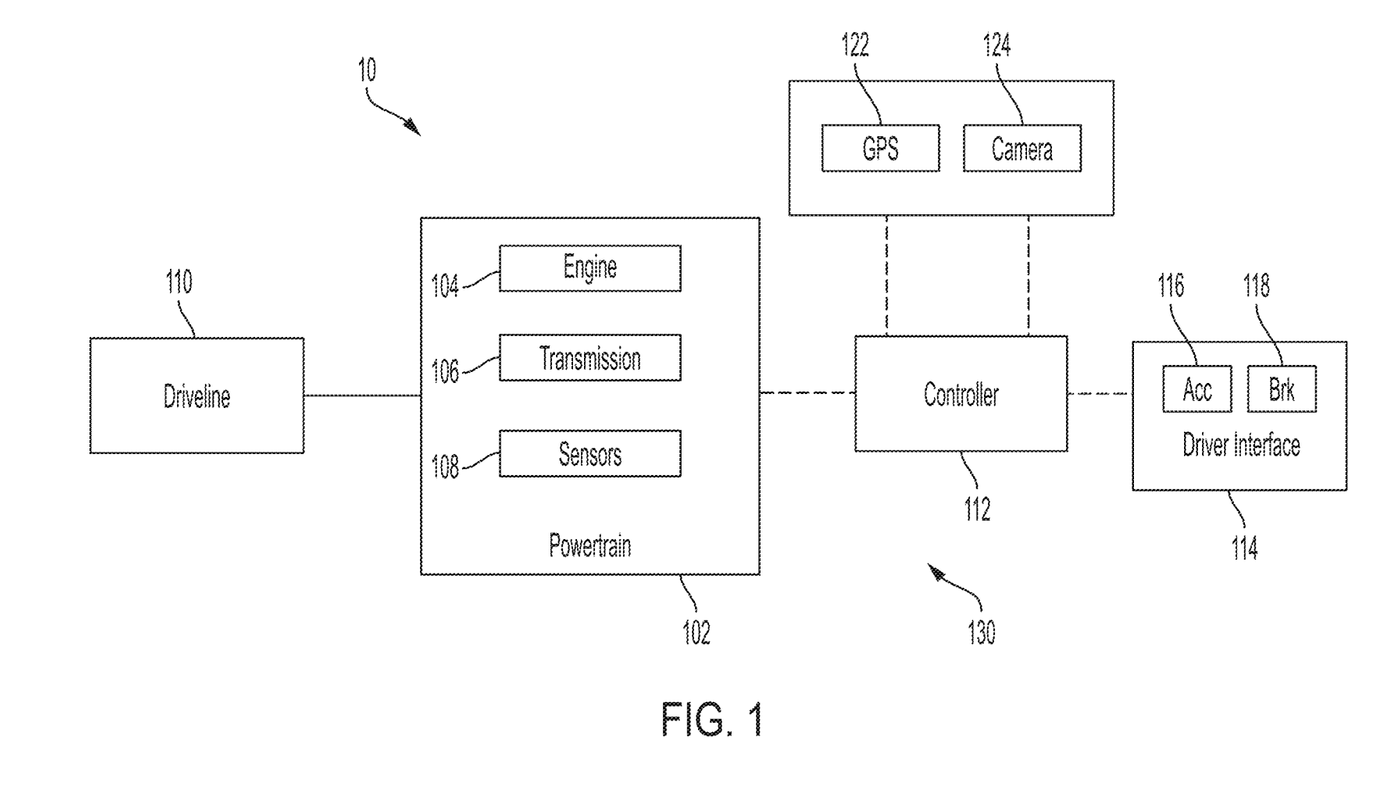
FIG. 1 is a functional block diagram of a vehicle with an engine and a predictive Driver Intent To Stop (DITS) system in accordance with the principles of the present disclosure.

Referring now to FIG. 1, a functional block diagram of an example vehicle is illustrated and generally identified at reference numeral 10. The vehicle 10 comprises a powertrain 102 including an internal combustion engine 104, a transmission 106, and one or more sensors 108 associated with the engine 104. In the example embodiment, the engine 104 is equipped with an automatic stop-start system (not shown) configured to automatically shut down and restart a vehicle engine. The one or more sensors 108 can include, for example, a vehicle speed sensor, a vehicle deceleration sensor, a brake pedal pressure/position sensor, an accelerator pedal pressure/position sensor, a steering wheel position/gradient sensor. It will be appreciated that the powertrain 102 can also include other suitable components, such as an electric motor. The powertrain 102 is configured to generate drive torque that is transferred via the transmission 106 to a driveline 110 for vehicle propulsion.

A controller 112 is configured to control operation of the vehicle 10, including primarily controlling the powertrain 102 to generate a desired amount of drive torque, such as based on driver input via a driver interface 114 that includes, for example, an accelerator pedal 116 and a brake pedal 118. The controller 112 can also receive input/data from other components or systems 120 such as, for example, a GPS system 122 and vehicle camera system 124. The controller 112, sensors 108, and additional systems 120 are also referred to herein as a predictive DITS system 130 for the engine 104 according to the principles of the present application. As used herein, the term module or controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
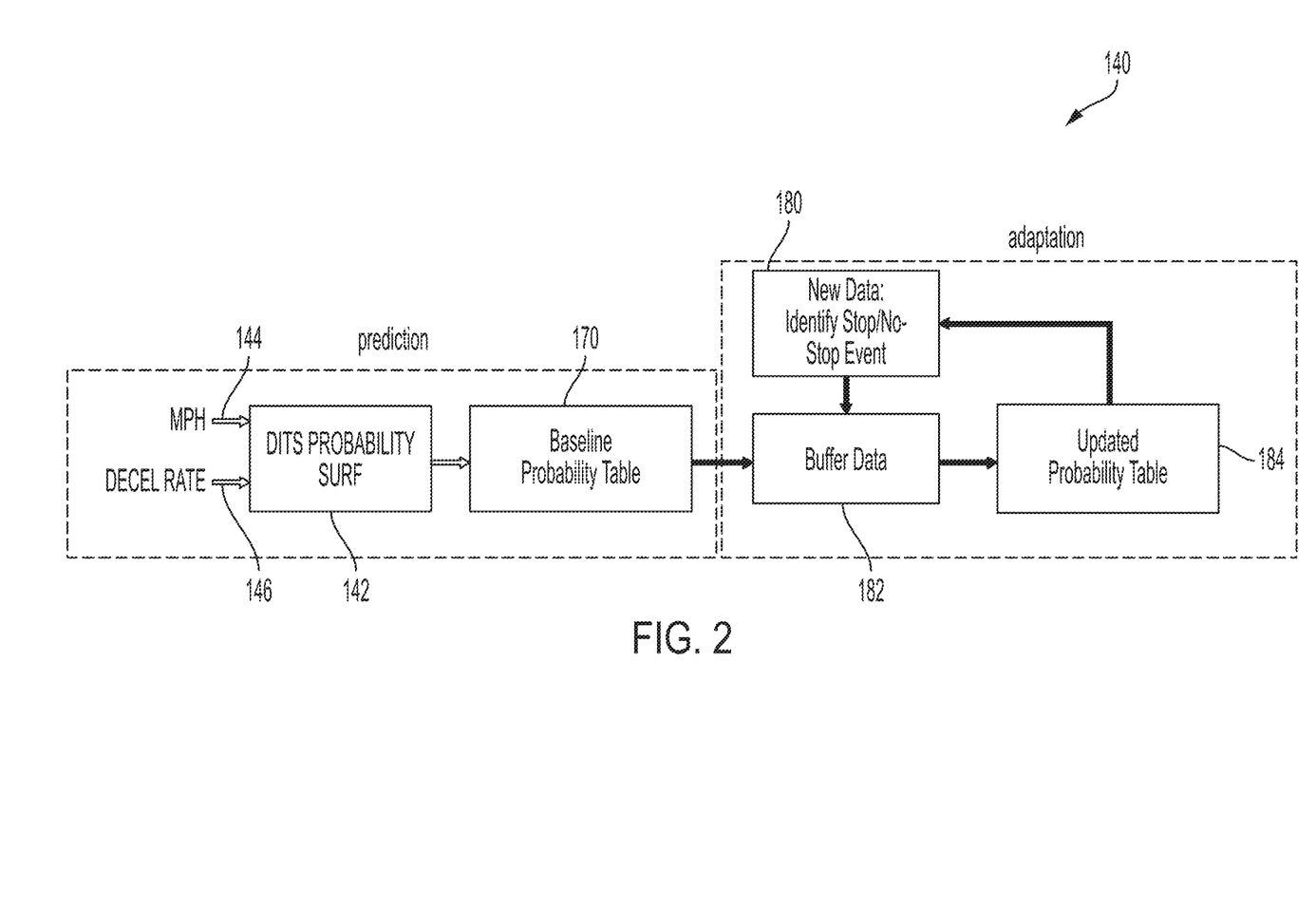
FIG. 2. illustrates a block diagram of an example architecture for the predictive DITS system, in accordance with the principles of the present disclosure.

Referring now to FIG. 2, a functional block diagram of an example architecture 140 for the predictive DITS system 130 is illustrated. As shown, a calibration module 142 receives a set of inputs including parameters measured by sensors 108. In the example embodiment, the calibration module 142 is a two-dimensional calibration surface for DTIS probability, and the measured parameters include vehicle speed 144 and deceleration rate 146. Such example data is illustrated by the graph 150 shown in FIG. 3, which plots both vehicle speed 152 and deceleration rate 154 over time. The calibration module 142 identifies braking events over multiple data sets, which are, for example, taken at fixed time intervals during braking.

Figure 3:
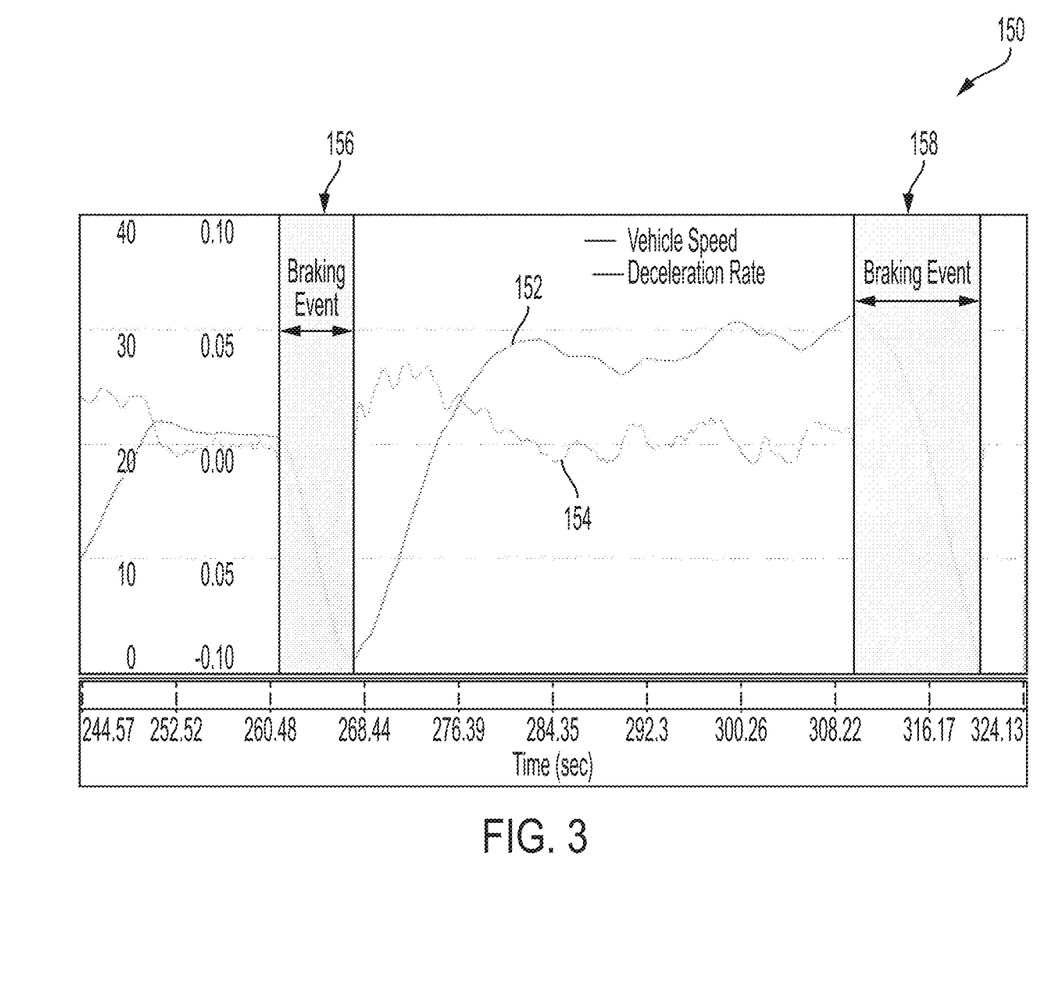
FIG. 3 is a graph illustrating a plot of example data utilized for the predictive DITS system, including vehicle speed and deceleration rate over time, a change of mind braking event, and a complete stop braking event, in accordance with the principles of the present disclosure.

In each data set, the calibration module 142 is configured to identify two types of braking maneuvers at low speed (brake pressure): a change of mind (no-stop) braking event 156 and a complete stop braking event 158 (see FIG. 3). When vehicles are rolling, not all drivers come to stop in the same way. Drivers often tend to modulate the accelerator pedal 116 and a brake pedal 118 to get a good deceleration feel before coming to a complete stop. Sometimes, however, it may appear the driver is coming to a complete stop, but the driver does not intend to stop and accelerates (referred to as the "change of mind"). In one example, change of mind (no-stop) is defined by high brake release gradient (e.g., driver suddenly releases the brake), driver tip-in after ESS is allowed (e.g., driver quickly presses the accelerator), or any maneuver indicating driver does not intend to stop the vehicle, which can potentially lead to unintended engine shut off. Accordingly, prediction of the DITS facilitates minimizing the unintended change of mind engine shut offs and improving driver experience.

Figure 4:
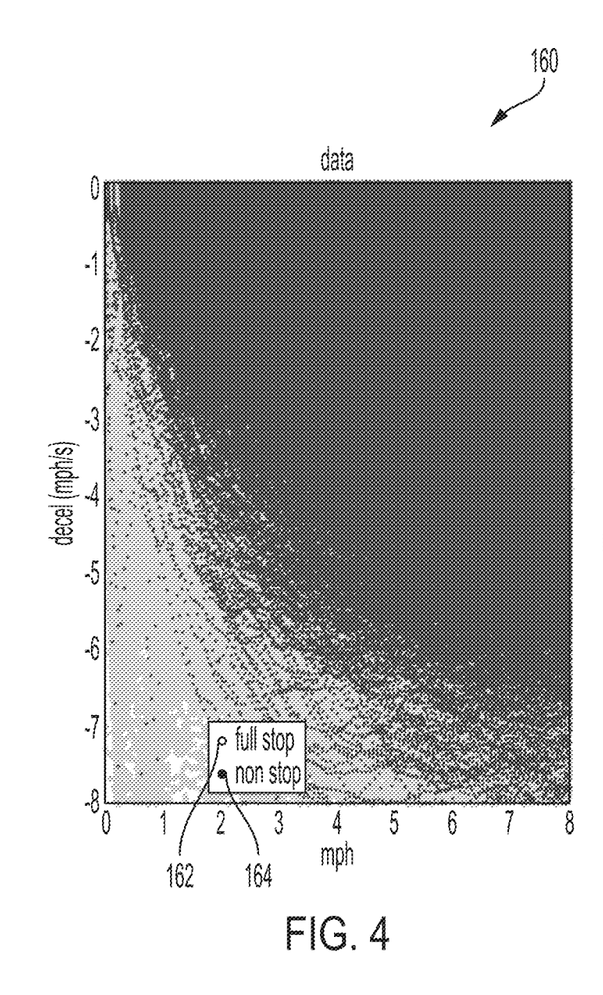
FIG. 4 illustrates an example probability map generated by the predictive DITS system, including sample speed and deceleration values during braking events, in accordance with the principles of the present disclosure.
Figure 5:
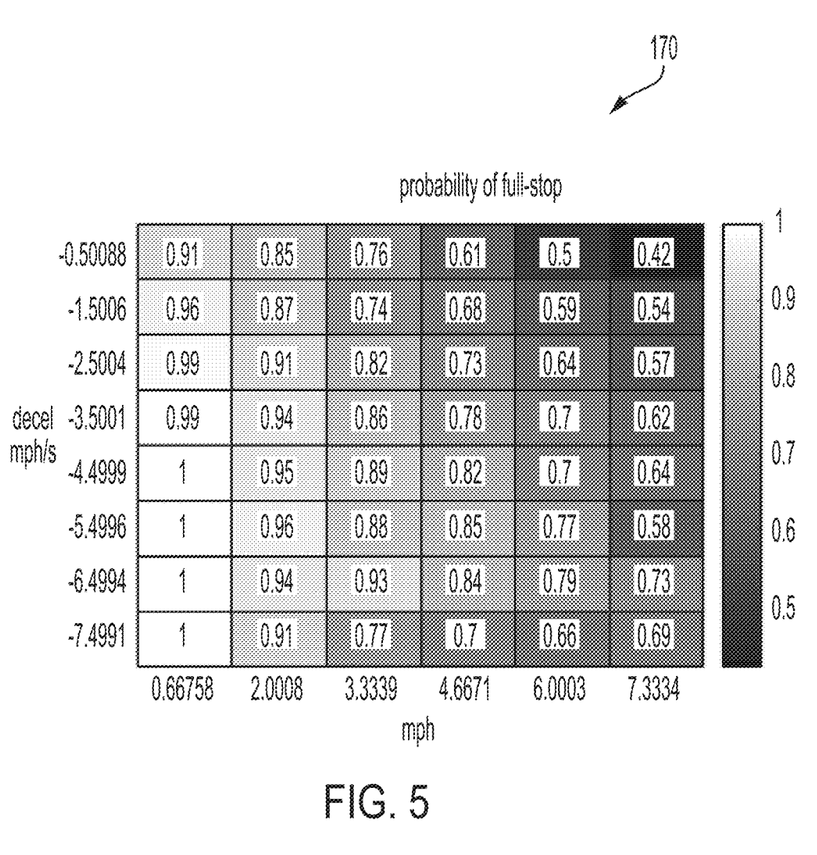
FIG. 5 illustrates an example matrix of the probability map shown in FIG. 4, in accordance with the principles of the present disclosure.

With additional reference to FIG. 4, the calibration module 142 subsequently generates a probability map 160 utilizing the multiple data sets. In the example embodiment, the probability map 160 plots a plurality of points or dots representing one data sample where the x-axis is vehicle speed (MPH) and the y-axis is deceleration (MPH/s). A first dot type 162 indicates if the data sample resulted in a complete stop, and a second dot type 164 indicates if the data sample resulted in a no-stop (e.g., change of mind braking event). The calibration module 142 then generates a matrix of the data in the probability map 160 to provide a baseline probability table 170 (FIG. 5), illustrating the statistical probability of a stop for a given vehicle speed and deceleration. The controller 112 may then store the baseline table 170 (e.g., in a memory) for future reference or use. Although illustrated as a 6×8 cell matrix, it will be appreciated that baseline table 170 may have any suitable number of rows and columns such as, for example 18×30, 10×10, or 5×5.

With continued reference to FIG. 2, once the baseline probability table 170 is established, the predictive DITS system 130 is configured to optionally operate with an additional adaptive strategy. The initial "prediction" strategy is generated without considering any particular driving pattern. However, every individual driver has a unique driving behavior. Accordingly, the predictive DITS strategy is configured to adapt to different driving patterns with an "adaptation" strategy. As illustrated, new stop/no-stop event data 180 is received from additional data sets like those shown in FIG. 3. The new data is buffered (e.g., as shown in FIG. 6), and the buffered data 182 is utilized to update the probability value in the cells of the baseline probability table 170 and generate an updated probability table 184.

Figure 6:
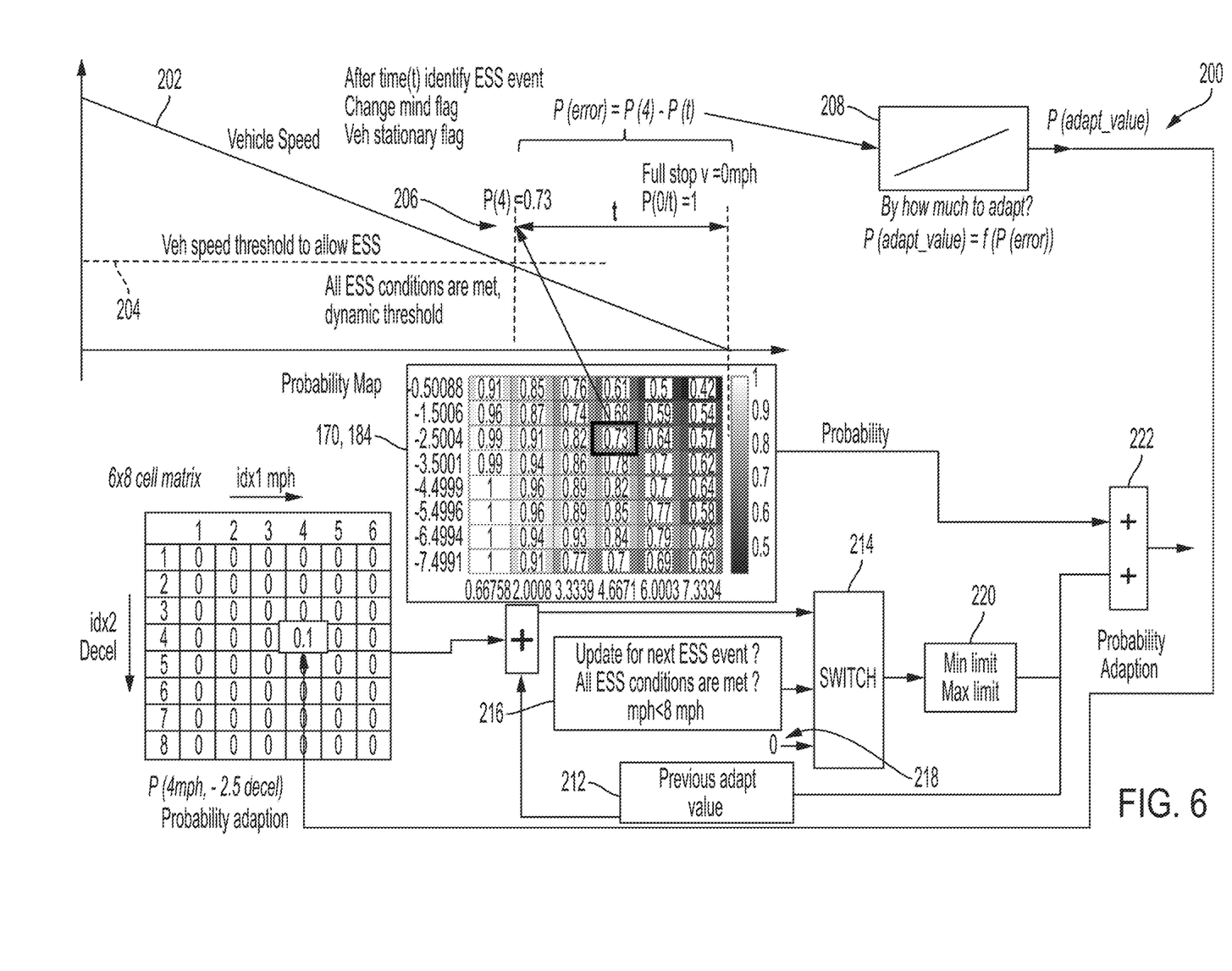
FIG. 6 illustrates a flow diagram of one detailed example of the adaptive control shown in FIG. 2, in accordance with the principles of the present disclosure.

With reference now to FIG. 6, one example operation 200 of the adaptation strategy is illustrated. The adaptation strategy is performed after a complete stop braking event occurs to increase one or more of the probability values charted in the updated probability table 184. Although not shown, it will be appreciated that a similar operation is performed after a change of mind braking event occurs to decrease one or more of the probability values charted in the updated probability table 184.

In the example operation 200, the vehicle speed 202 is monitored against the vehicle speed threshold to allow ESS 204. When all ESS conditions are met, ESS is allowed at a point 206 a probability error P(error) is determined based on the difference of the probability 'P' at point 206 for the given vehicle speed and deceleration on the probability table 170 or 184 and the probability P(t) after the vehicle stop (or no-stop) after time 't'. Next, at 208, a value P(adapt_value) is determined as a function of P(error) and an update rate determined, for example, via calibration. In one example, the updated rate depends on vehicle speed when the engine function (e.g., R-ESS) is allowed and the probability of stopping at that speed. At lower speeds, P(adapt_value) is smaller since less adaptation is required as the probability of stopping is already high. At higher speeds, the P(adapt_value) can be larger. As such, the update rate is a multiplier for P(error) based on probability of stopping at that vehicle speed, and is calibrated for different engine functions such as R-ESS.

The P(adapt_value) is then utilized to increase the probability value in the matrix cells 210 by the determined value (or decreased, after a change of mind event). The increased/decreased probability value is combined with any previous adapt value 212 and provided to switch 214. At 216, it is determined if the adjusted probability value is to be utilized to update the next ESS event and if all ESS conditions are met. If no, the adjusted probability value is set to zero at 218. If yes, at 220, it is determined if the adjusted probability value is within a predetermined maximum and minimum. If no, the adjusted probability value is set at the previous adapt value 212. If yes, at 222, the adjusted probability value is utilized to adjust the probability table 170, 184 and establish a new updated probability table 184.

Figure 7:
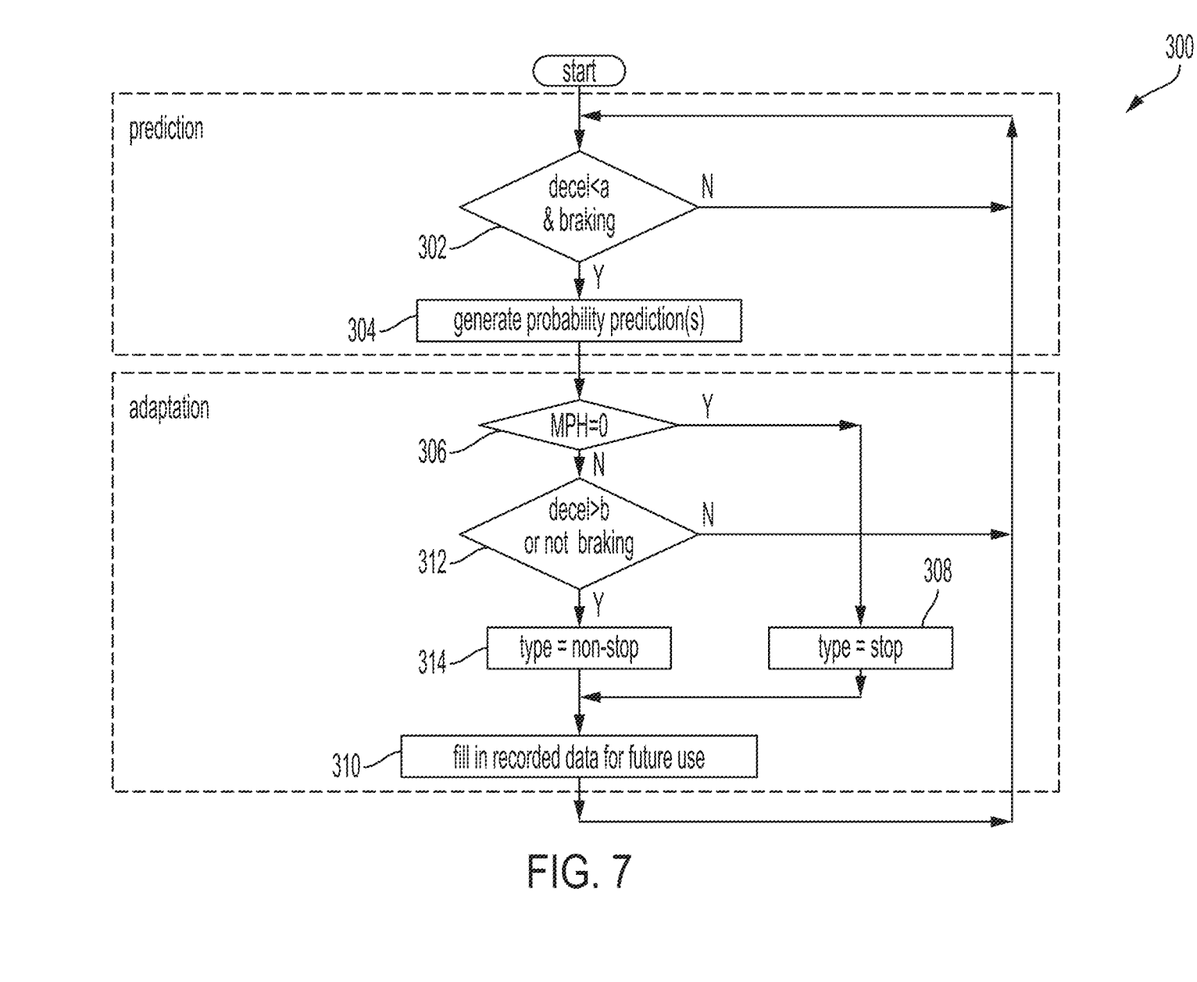
FIG. 7 illustrates a flow diagram of an example method of operating the predictive DITS system, in accordance with the principles of the present disclosure.

Turning now to FIG. 7, a flow diagram of an example predictive DITS method 300 for a vehicle is illustrated. While the method 300 is described with specific reference to components of vehicle 10, it will be appreciated that this method 300 can be applicable to various other suitable vehicles. At step 302, the predictive DITS system 130 determines if vehicle deceleration is less than a predetermined value 'a' and if the vehicle is braking. If no, control returns to step 302. If yes, the predictive DITS system 130 generates probability prediction(s) as shown and described in FIGS. 2-5. As shown, this is the prediction part of method 300. Subsequently, method 300 enters the adaptation portion thereof.

At step 306, system 130 determines if vehicle speed is equal to zero. If yes, the data is categorized at step 308, for example, as "stop" and subsequently recorded for future use at step 310. If no, at step 312, the predictive DITS system 130 determines if vehicle deceleration is greater than a predetermined value 'b' or is not braking. If no, control returns to step 302. If yes, the data is categorized at step 314, for example, as "no-stop" and subsequently recorded for future use at step 308. Control then returns to step 302 and the process is repeated. Such information may then be utilized during vehicle control to determine whether or not to perform an operation such as ESS, R-ESS, FSO, cylinder deactivation, or other operation. For example, if control determines the DITS probability is greater than a predetermined threshold indicating the driver is planning to stop the vehicle, the controller 112 can shut down the engine 104 when the vehicle speed is greater than zero.

Described herein are systems and methods for predicting a driver's intent to stop a vehicle. The described strategies provide accurate estimation of stop probability as a function of inputs like vehicle speed and deceleration rate. The strategy utilizes statistical methods to map a pattern of stop and no-stop events based on braking events analyzed in multiple data sets. A probability map is established as a function of vehicle speed and deceleration rate, where higher probability indicates a higher chance of the driver coming to a stop. As each driver has different driving behaviors, the stop prediction is improved by adapting the probability map based on individual driver behavior by accumulating data over a period of stop and no-stop events. Such predictions improve the selective activation of shutdown in fuel saving technologies like ESS and R-ESS, which may reward calm drivers with better fuel economy and power-demanding drivers with faster engine response.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A predictive driver intention to stop (DITS) system for a vehicle having an engine, the system comprising:
   one or more sensors configured to measure a set of operating parameters of the vehicle including at least (i) vehicle speed and (ii) vehicle deceleration rate; and
   a controller configured to:
      identify no-stop braking events and complete stop braking events;
      reference a generated baseline probability table indicating a probability of a driver braking to bring the vehicle to a stop at the vehicle speed and vehicle deceleration rate measured during at least one of the identified no-stop braking events and complete stop braking events;
      predict a DITS event based on the generated baseline probability table;

control operation of the engine based on the predicted DITS event to facilitate reducing vehicle fuel consumption and/or tailpipe emissions;

adapt the baseline probability table based on individual driver behavior by accumulating vehicle speed and vehicle deceleration rate data over a period of no-stop braking events and complete stop braking events; and generate an updated probability table based on the accumulated data, wherein the updated probability table is generated by:
   determining a point 'P' when an engine start/stop (ESS) is allowed;
   determining a probability error P(error) at point 'P';
   determining a value P(adapt value) as a function of P(error) and a calibrated updated rate; and
   updating one or more matrix cells of the baseline probability table with the P(adapt value).

2. The system of claim 1, wherein the baseline probability table is generated from a probability map plotting data samples of vehicle speed and deceleration rate during no-stop braking events and the complete stop braking events.

3. The system of claim 2, wherein the baseline probability table is further generated from a matrix of the data in the probability map.

4. The system of claim 1, where the controller is further programmed to identify the no-stop braking event by identifying a high brake release gradient or driver acceleration tip-in during engine start-stop (ESS).

5. The system of claim 1, wherein controlling operation of the engine based on the predicted DITS event includes initiating an engine start stop (ESS) operation.

6. The system of claim 1, wherein controlling operation of the engine based on the predicted DITS event includes initiating a rolling engine start stop (R-ESS) operation.

7. The system of claim 1, wherein controlling operation of the engine based on the predicted DITS event includes initiating a fuel shut off (FSO) operation.

8. The system of claim 1, wherein controlling operation of the engine based on the predicted DITS event includes initiating a cylinder deactivation of the engine.

9. A method of predicting driver intent to stop (DITS) in a vehicle having an engine, the method comprising:
   measuring, by at least one sensor, a set of operating parameters of the vehicle including at least (i) vehicle speed and (ii) vehicle deceleration rate;
   identifying, by a controller, no-stop braking events and complete stop braking events;
   referencing, by the controller, a generated baseline probability table indicating a probability of a driver braking to bring the vehicle to a stop at the vehicle speed and vehicle deceleration rate measured during at least one of the identified no-stop braking events and complete stop braking events;
   predicting, by the controller, a DITS event based on the generated baseline probability table;
   controlling, by the controller, operation of the engine based on the predicted DITS event to facilitate reducing vehicle fuel consumption and/or tailpipe emissions;
   adapting the baseline probability table based on individual driver behavior by accumulating vehicle speed and vehicle deceleration rate data over a period of no-stop braking events; and
   generating an updated probability table based on the accumulated data, wherein the updated probability table is generated by:
      determining a point 'P' when an engine start/stop (ESS) is allowed;
      determining a probability error P(error) at point 'P';
      determining a value P(adapt value) as a function of P(error) and a calibrated updated rate; and
      updating one or more matrix cells of the baseline probability table with the P(adapt value).

10. The method of claim 9, wherein the baseline probability table is generated from a probability map plotting data samples of vehicle speed and deceleration rate during no-stop braking events and the complete stop braking events.

11. The method of claim 10, wherein the baseline probability table is further generated from a matrix of the data in the probability map.

12. The method of claim 9, further comprising identifying the no-stop braking event by identifying a high brake release gradient or driver acceleration tip-in during engine start-stop (ESS).

13. The method of claim 9, wherein controlling operation of the engine based on the predicted DITS event includes initiating an engine start stop (ESS) or a rolling engine start stop (R-ESS) operation.

14. The method of claim 9, wherein controlling operation of the engine based on the predicted DITS event includes initiating a fuel shut off (FSO) operation.

15. The method of claim 9, wherein controlling operation of the engine based on the predicted DITS event includes initiating a cylinder deactivation of the engine.

* * * * *